United States Patent

Spaniol

[11] Patent Number: 5,896,514
[45] Date of Patent: Apr. 20, 1999

[54] LOGIC IMPLEMENTATION OF CONTROL SIGNALS FOR ON-SILICON MULTI-MASTER DATA TRANSFER BUS

[75] Inventor: David Gerard Spaniol, Phoenix, Ariz.

[73] Assignee: VLSI Technology, Inc., San Jose, Calif.

[21] Appl. No.: 08/918,596

[22] Filed: Aug. 23, 1997

[51] Int. Cl.$^6$ ............................................. G06F 13/00
[52] U.S. Cl. ..................... 395/287; 395/280; 395/306; 395/311
[58] Field of Search ........................ 395/287, 280, 395/306, 309, 311

[56] References Cited

U.S. PATENT DOCUMENTS

5,502,824  3/1996  Heil ............................................. 395/293

*Primary Examiner*—Glenn A. Auve
*Assistant Examiner*—Ario Etienne
*Attorney, Agent, or Firm*—Douglas L. Weller

[57] ABSTRACT

Within a single integrated circuit, a bus operates in accordance with a bus protocol. The bus protocol includes a first control signal which, when not implemented within a single integrated circuit, is implemented using a pull-up resistor and tri-state gates within functional blocks attached to the bus. A first functional block includes a first input line for receiving an input component of the first control signal, and includes first logic means for generating a first output component of the first control signal. A second functional block includes a second input line for receiving the input component of the first control signal, and includes second logic means for generating a second output component of the first control signal. A logic block includes first logic for generating the input component of the first control signal. The first logic utilizes the first output component and the second output component to generate the input component of the first control signal.

20 Claims, 8 Drawing Sheets

LOGIC IMPLEMENTATION OF CONTROL SIGNALS FOR ON-SILICON MULTI-MASTER DATA TRANSFER BUS

BACKGROUND

The present invention concerns input/output busses for computing systems and pertains particularly to logic implementation of control signals for an on-silicon multi-master data transfer bus.

For an input/output (I/O) bus, such as an I/O bus which uses the Peripheral Component Interconnect (PCI) bus protocol, a pull-up resistor is required for certain signals in order to maintain an inactive state. For example, in the PCI bus protocol, the following sustained tri-state and open drain signals require a pull-up resistor to maintain an inactive state: FRAME#, IRDY# TRDY#, STOP#, LOCK#, DEVSEL#, PERR#, SERR#, INTA#, INTB#, INTC#, INTD#, CLKRUN#, REQ64#, and ACK64#. These tri-state and open drain signals often are required to maintain an inactive state for many clock signals.

While use of tri-state and open drain signals which require a pull-up resistor is generally an efficient way to implement an I/O bus, this is not an efficient strategy when using the bus protocol to connect logic blocks within a single integrated circuit. This is because pull-up resistors which are capable of meeting the specifications for buses that operate in accordance with the PCI bus are generally not available on an integrated circuit. Thus, on an integrated circuit, "bus keepers" whose purpose is to keep tri-stated signal voltage levels from drifting out of specification for inordinate lengths of time are not guaranteed to keep a tri-stated signal in its inactive state and may switch to an active state unintentionally.

When integrating functional blocks connected by a PCI bus onto a single integrated circuit, it is therefore generally necessary to strip off the PCI local bus interface from the blocks to be integrated and to define new bus protocol control signals which are not shared. However, this stripping of the PCI protocol bus interface creates many problems to design integrity. Further, defining and verifying a new bus protocol control requires resources and time. Additionally, a new bus protocol, while optimal for one project may be less optimal for another project. Also, stripping off a PCI protocol bus interface and substituting another bus interface greatly increases the risk of introducing logic and architectural errors because of the dramatic changes to blocks that have been verified already as functionally and architecturally correct with the PCI local bus interface.

SUMMARY OF THE INVENTION

In accordance with the preferred embodiment of the present invention, within a single integrated circuit, a bus operates in accordance with a bus protocol. The bus protocol includes a first control signal which, when not implemented within a single integrated circuit, is implemented using a pull-up resistor and tri-state gates within functional blocks attached to the bus. For example, the bus protocol is a Peripheral Component Interconnect (PCI) bus protocol.

A first functional block includes a first input line for receiving an input component of the first control signal, and includes first logic means for generating a first output component of the first control signal.

For example, the first logic means performs an equivalent of a logic OR on a first control signal output signal of the first functional block and a first control signal output enable signal of the first functional block. Alternatively, the first logic means forwards a first control signal output signal of the first functional block as the first output component of the first control signal. Alternatively, the first logic means forwards a first control signal output enable signal of the first functional block as the first output component of the first control signal.

A second functional block includes a second input line for receiving the input component of the first control signal, and includes second logic means for generating a second output component of the first control signal.

A logic block includes first logic for generating the input component of the first control signal. The first logic utilizes the first output component and the second output component to generate the input component of the first control signal.

For example, the first logic performs an equivalent of a logic AND on the first output component and the second output component to generate the input component of the first control signal.

Additional functional blocks may be added. For example, a third functional block includes a third input line for receiving the input component of the first control signal. The third functional block may additionally include a third logic means for generating a third output component of the first control signal. In this case, the first logic also utilizes the third output component to generate the input component of the first control signal.

In the preferred embodiment, each functional block handles a number of control signals. For example, the bus protocol includes a second control signal. The first functional block additionally includes a first additional input line for receiving an input component of the second control signal, and logic for generating a second output component of the second control signal. The second functional block additionally includes a second additional input line for receiving the input component of the second control signal, and logic for generating a second output component of the second control signal. The logic block additionally includes second logic for generating the input component of the second control signal. The first logic utilizes the first output component of the second control signal and the second output component of the second control signal to generate the input component of the second control signal.

The present invention allows bus protocols, such as the PCI protocol, to be implemented between functional blocks on a single integrated circuit. The circuit is implemented without requiring pull-up resistors or tri-state gates.

DESCRIPTION OF THE PRIOR ART

Figure 1:
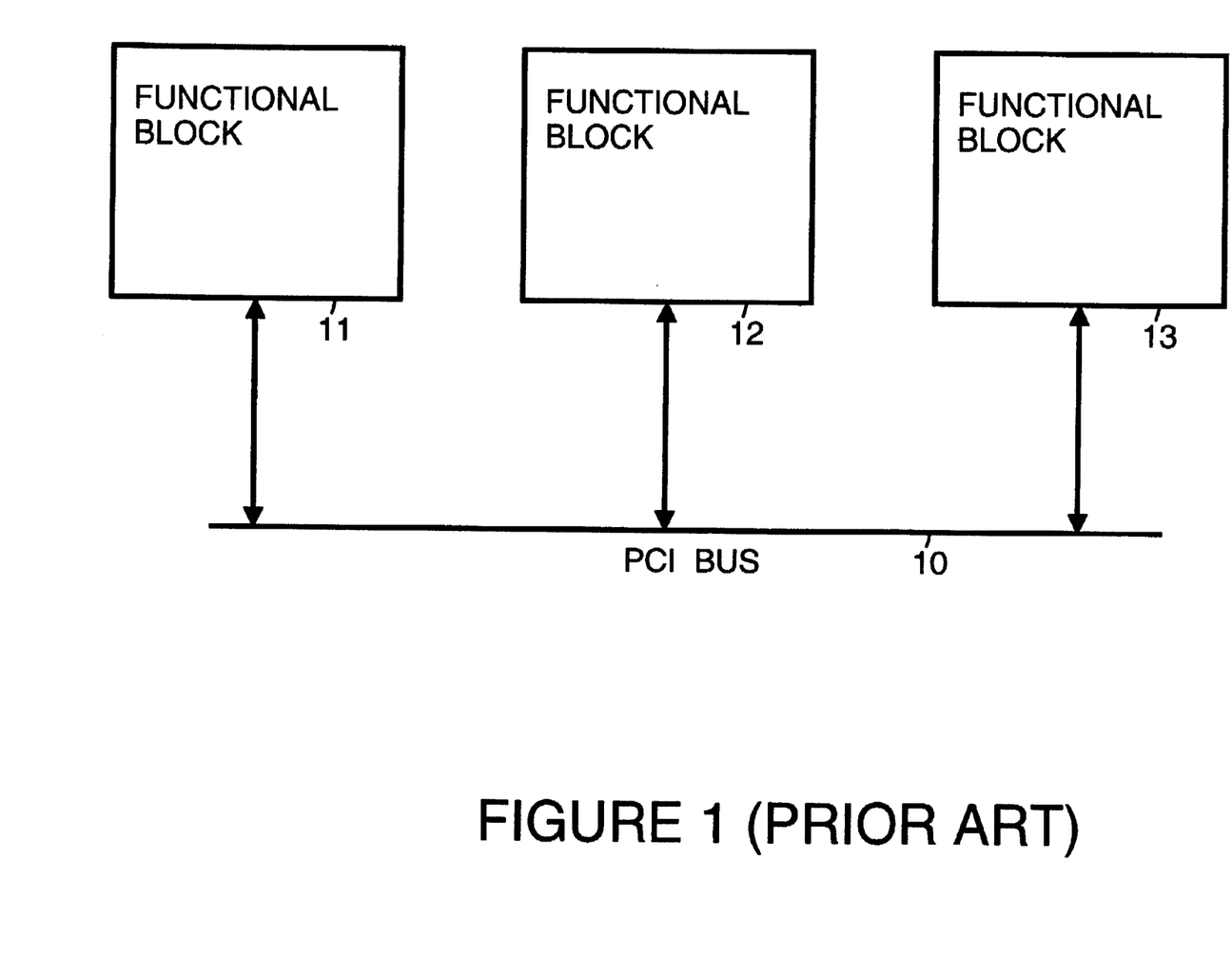
FIG. 1 shows functional blocks connected to an input/output bus in accordance with the prior art.

FIG. 1 shows a functional block 11, a functional block 12 and a functional block 13 connected together using a bus 10 which operates in accordance with the PCI bus protocol. Each functional block is, for example, an I/O card connected to the backplane of a computing system. The I/O cards may add functionality such as audio, video or interface to a bus with another bus protocol.

In the PCI bus protocol, certain sustained tri-state and open drain signals require a pull-up resistor to maintain an inactive state. These include the FRAME#, IRDY# TRDY#, STOP#, LOCK#, DEVSEL#, ?PERR#, SERR#, INTA#, INTB#, INTC#, INTD#, CLKRUN#, REQ64# and ACK64# signals.

Figure 2:
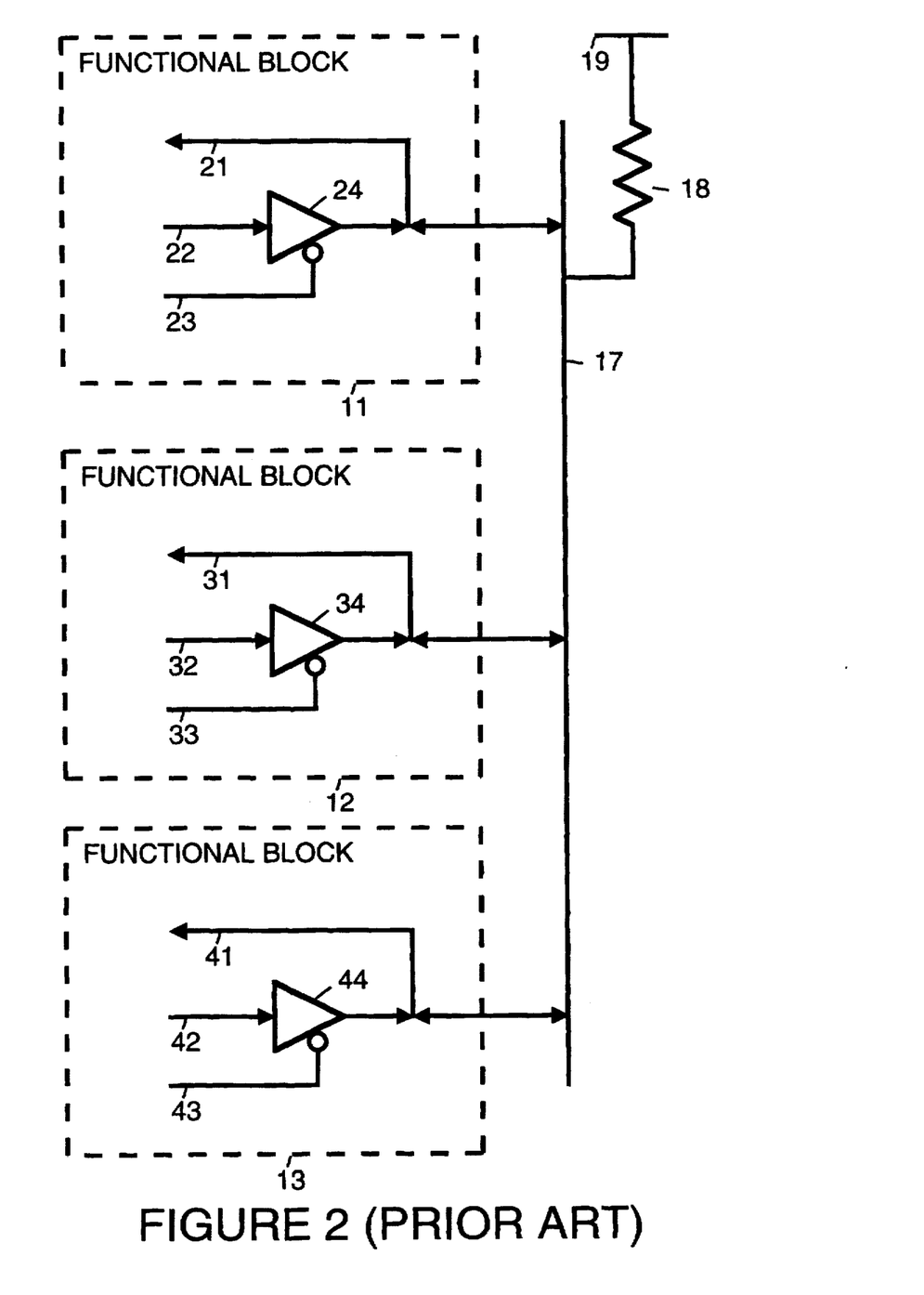
FIG. 2 shows a pull-up resistor which is used with tri-state logic, within each functional block shown in FIG. 1, to implement control signals on an input/output bus in accordance with the prior art.

For example, FIG. 2 shows a FRAME# line 17, within PCI bus 10. FRAME# line 17 carries the FRAME# signal for the PCI bus. A pull-up resistor 18 pulls the voltage of FRAME# signal to VDD 19 when FRAME# signal is inactive. For functional block 11, a FRAME#_IN signal is received from FRAME# line 17 on a line 21. A FRAME#_OUT signal on a line 22 is gated by a tri-state gate 24. Tri-state gate 23 is controlled by a FRAME#_OE# signal on a line 23.

For functional block 12, a FRAME#_IN signal is received from FRAME# line 17 on a line 31. A FRAME#_OUT signal on a line 32 is gated by a tri-state gate 34. Tri-state gate 33 is controlled by a FRAME#_OE# signal on a line 33. For functional block 13, a FRAME#_IN signal is received from FRAME# line 17 on a line 41. A FRAME#_OUT signal on a line 42 is gated by a tri-state gate 44. Tri-state gate 43 is controlled by a FRAME#_OE# signal on a line 43.

Instead of tri-state gates with active low, tri-state gates with active high output enables may be used. Additionally, tri-state gates with inverting outputs may be used.

While use of pull-up resistor 18 and tri-state gates 24, 34, and 44 is generally an efficient way to implement an I/O bus signals for an I/O bus, this is not an efficient strategy when using the bus protocol to connect logic blocks within a single integrated circuit. This is because pull-up resistors which are capable of meeting the specifications for buses that operate in accordance with the PCI bus are generally not available on an integrated circuit.

Figure 7:
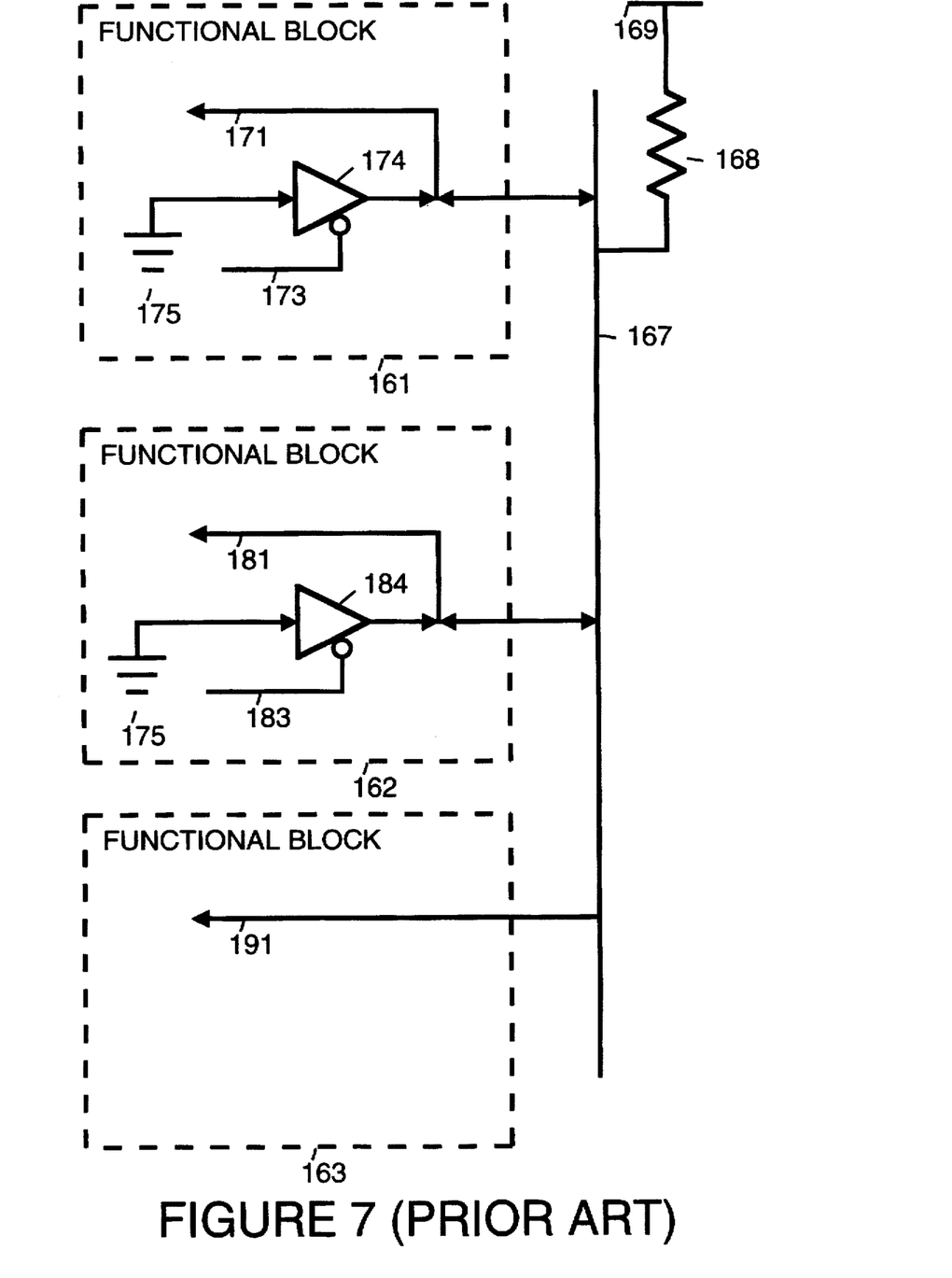
FIG. 7 shows an open drain signal which is used with tri-state logic, within each functional block shown in FIG. 1, to implement control signals on an input/output bus in accordance with the prior art.

Likewise FIG. 7 shows an INTA# line 167, within PCI bus 160. INTA# line 167 carries the INTA# signal for the PCI bus. The INTA# signal is an open drain signal. A pull-up resistor 168 pulls the voltage of INTA# signal to VCC 169 when INTA# signal is inactive. For functional block 161, an INTA#_IN signal is received from INTA# line 167 on a line 171. A ground signal on a ground line 175 is gated by a tri-state gate 174. Tri-state gate 173 is controlled by an INTA#_OE# signal on a line 173.

For functional block 162, an INTA#_IN signal is received from INTA# line 167 on a line 181. A ground signal on ground line 175 is gated by a tri-state gate 184. Tri-state gate 183 is controlled by an INTA#_OE# signal on a line 183. For functional block 163, an INTA#_IN signal is received from INTA# line 167 on a line 191.

In stead of a tri-stateable gate that mimics an open-drain, it is possible to implement this system using a real open-drain circuit. Furthermore, INTA# is typically a signal that is an output only for functional blocks except for an interrupt controller, for which INTA# would be an input only. Other open-drain signals may be bi-directional as shown in FIG. 7.

While use of pull-up resistor 168 is an efficient way to implement an I/O bus signals for an I/O bus, this is not an efficient strategy when using the bus protocol to connect logic blocks within a single integrated circuit. Pull-up resistors which are capable of meeting the specifications for buses that operate in accordance with the PCI bus are generally not available on an integrated circuit.

DESCRIPTION OF THE PREFERRED EMBODIMENT

Figure 3:
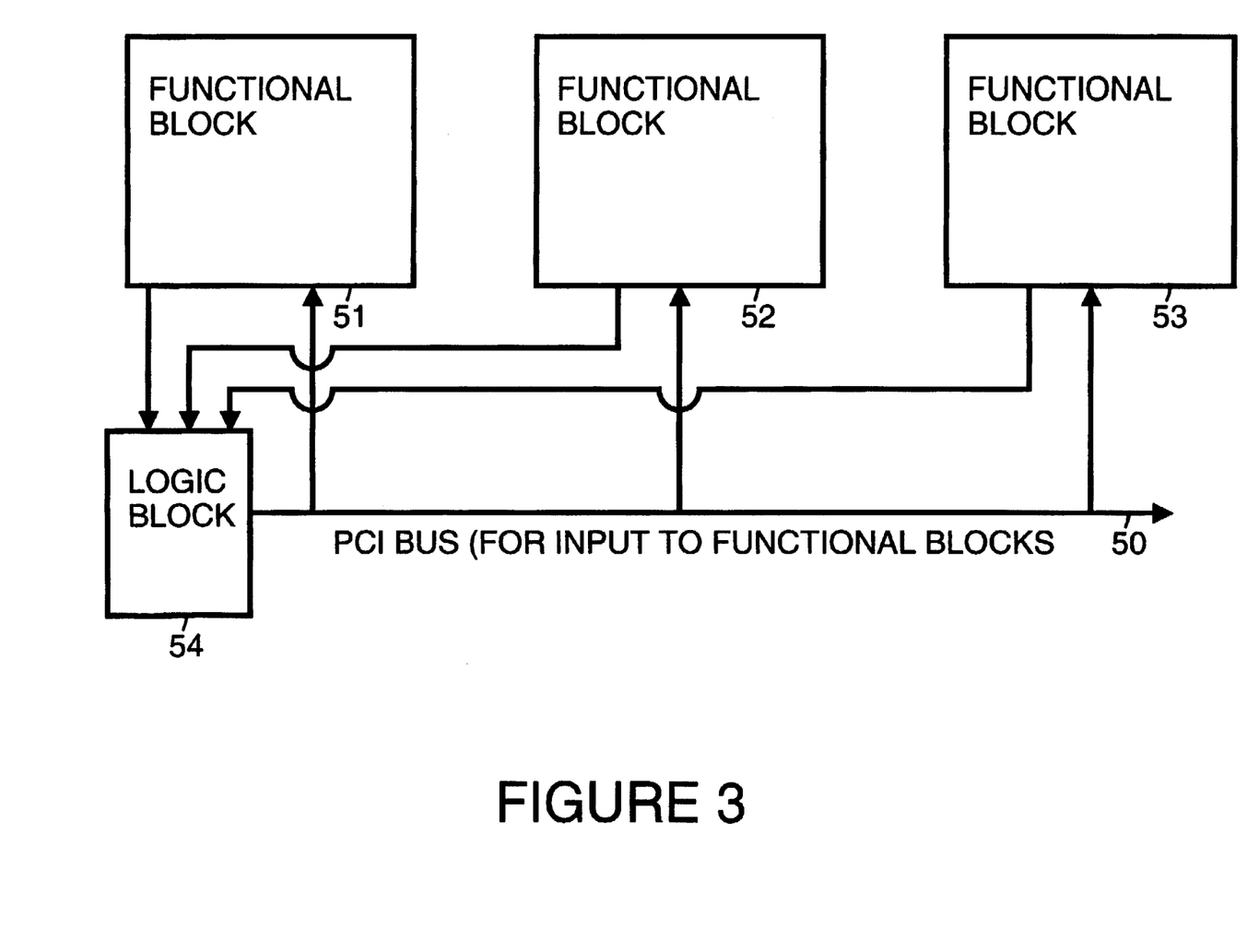
FIG. 3 shows functional blocks connected through a separate logic block to an input/output bus in accordance a preferred embodiment of the present invention.

FIG. 3 shows a functional block 51, a functional block 52 and a functional block 53. A modified bus 50 operates in accordance with the PCI bus protocol. The sustained tri-state and open drain signals which require a pull-up resistor to maintain an inactive state (i.e., the FRAME#, IRDY# TRDY#, STOP#, LOCK#, DEVSEL#, PERR#, SERR#, INTA#, INTB#, INTC#, INTD#, CLKRUN#, REQ64# and ACK64# signals) are generated using a logic block 54 without using a pull-up resistor or tri-state gates. Functional block 51, functional block 52, functional block 53, modified bus 50 and logic block 54 are all integrated on a single integrated circuit.

The signals which normally in the PCI bus protocol require a pull-up resistor are divided into their "input" and "output" signal components. The output signal component for each functional block is driven and not shared with any other functional block. Thus a signal such as FRAME# is reduced to FRAME#_IN and FRAME#_OUT. FRAME#_OUT for each logic block is never tri-stated or shared. Logic block 54 receives the FRAME#_OUT for each logic block and combines these to produce FRAME#_IN, which is a single input component of FRAME# used for all the functional blocks.

Figure 4:
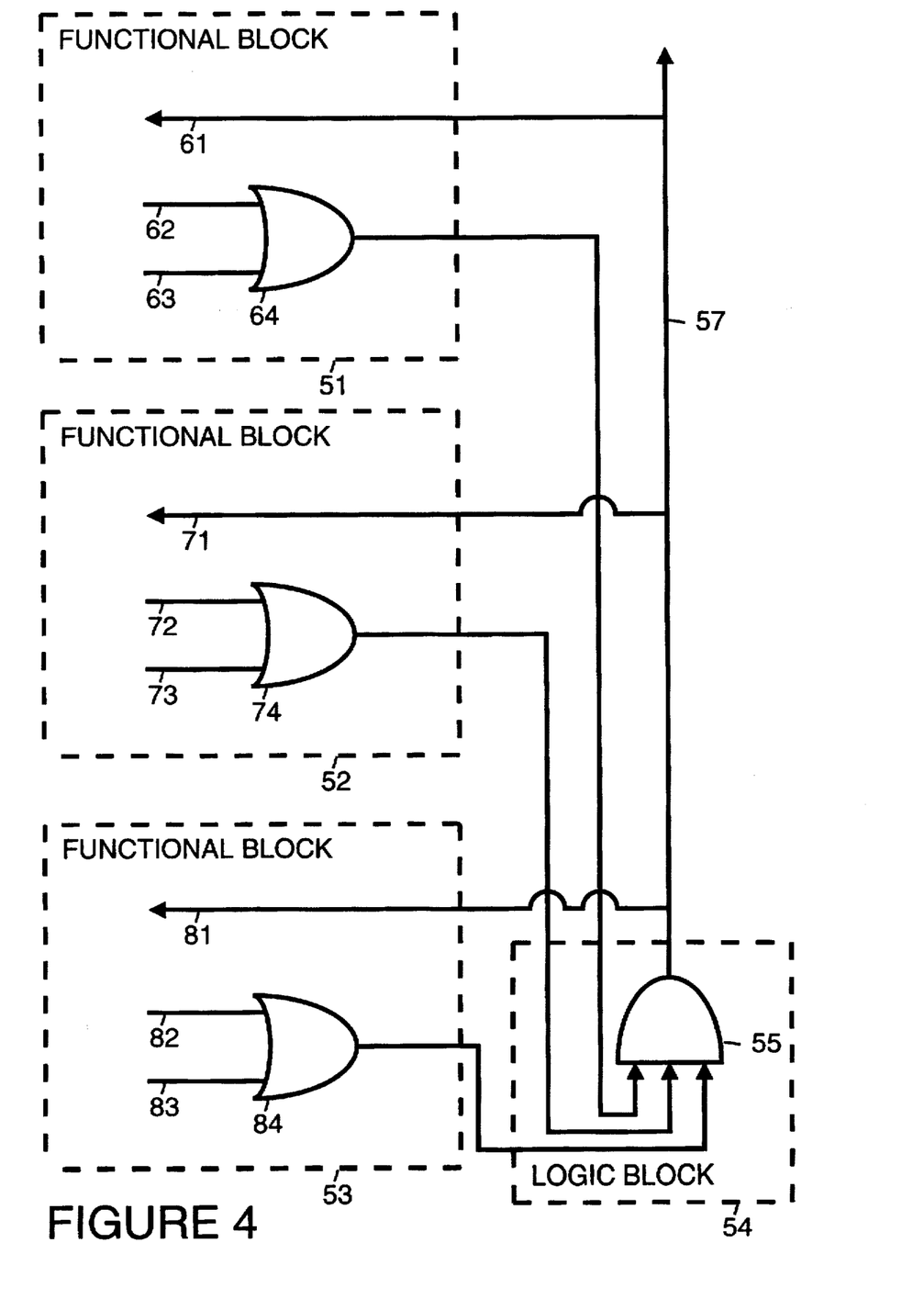
FIG. 4, FIG. 5, FIG. 6 show how equivalent bus signals may be implemented when integrating logic blocks with a local bus interface into a single integrated circuit in accordance with preferred embodiments of the present invention.

For example, FIG. 4 shows a FRAME# line 57, within PCI bus 50. FRAME# line 57 carries the FRAME# signal for PCI bus 50.

For functional block 51, a FRAME#_IN signal is received from FRAME# line 57 on a line 61. A logic OR gate 64 performs a logic OR of a FRAME#_OUT signal on a line 62 and a FRAME#_OE# signal on a line 63.

For functional block 52, a FRAME#_IN signal is received from FRAME# line 57 on a line 71. A logic OR gate 74 performs a logic OR of a FRAME#_OUT signal on a line 72 and a FRAME#_OE# signal on a line 73.

For functional block 53, a FRAME#_IN signal is received from FRAME# line 57 on a line 81. A logic OR gate 84 performs a logic OR of a FRAME#_OUT signal on a line 82 and a FRAME#_OE# signal on a line 83.

In logic block 54, a logic AND gate 55 performs a logic AND on the output of logic OR gate 64, logic OR gate 74 and logic OR gate 84 in order to generate the FRAME# signal on FRAME# line 57.

Figure 5:
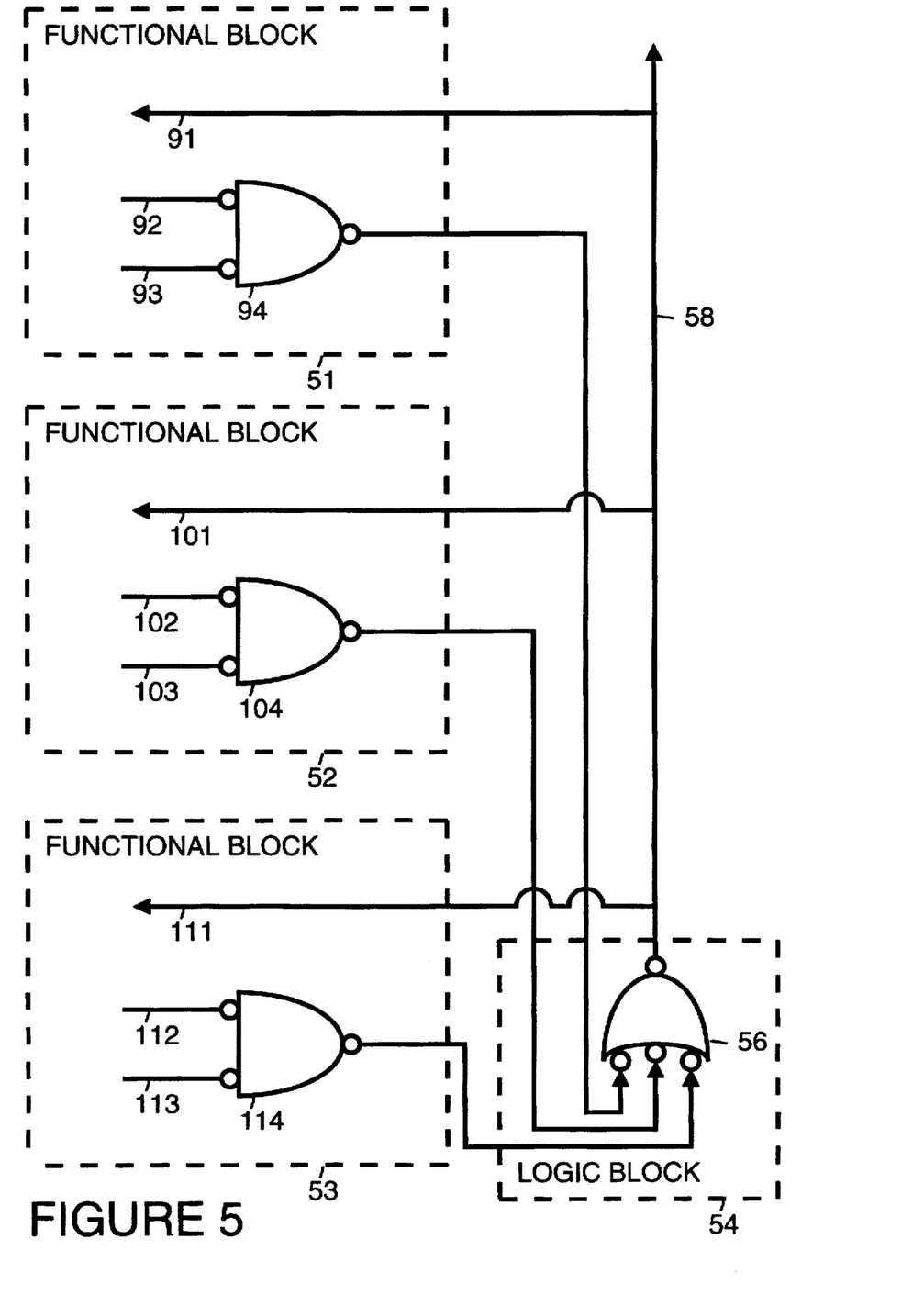

Each signal may be implemented in a similar way, using the same or equivalent logic. For example, FIG. 5 shows a DEVSEL# line 58, within PCI bus 50. DEVSEL# line 58 carries the DEVSEL# signal for PCI bus 50. Equivalent logic is used.

For functional block 51, a DEVSEL#_IN signal is received from DEVSEL# line 58 on a line 91. A logic NAND gate 94 performs a logic NAND of an inverted DEVSEL#_OUT signal on a line 92 and an inverted DEVSEL#_OE# signal on a line 93.

For functional block 52, a DEVSEL#_IN signal is received from DEVSEL# line 58 on a line 101. A logic NAND gate 104 performs a logic NAND of an inverted DEVSEL#_OUT signal on a line 102 and an inverted DEVSEL#_OE# signal on a line 103.

For functional block 53, a DEVSEL#_IN signal is received from DEVSEL# line 58 on a line 111. A logic NAND gate 114 performs a logic NAND of an inverted DEVSEL#_OUT signal on a line 112 and an inverted DEVSEL#_OE# signal on a line 113.

In logic block 54, a logic NOR gate 56 performs a logic NOR on the inverted output of logic NAND gate 94, logic NAND gate 104 and logic NAND gate 114 in order to generate the DEVSEL# signal on DEVSEL# line 58.

If the output components of the control signal is well behaved (i.e., always gives a true value), it is not always necessary to utilize the output enable for the control signal. This is illustrated by FIG. 6.

Figure 6:
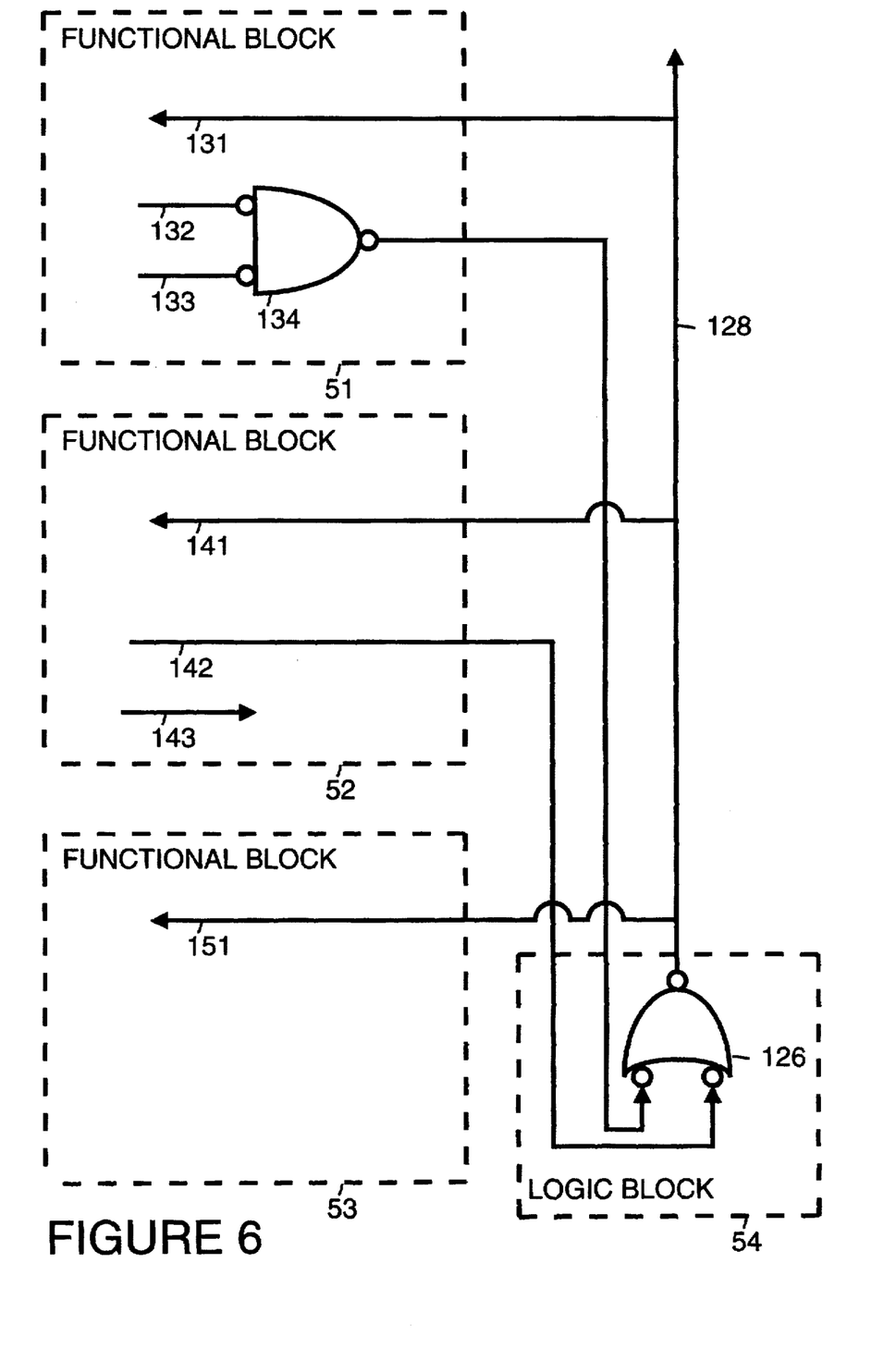

FIG. 6 shows an IRDY# line 128, within PCT bus 50. IRDY# line 128 carries the IRDY# signal for PCI bus 50.

For functional block 51, an IRDY#_IN signal is received from IRDY# line 128 on a line 131. A logic NAND gate 134 performs a logic NAND of an inverted IRDY#_OUT signal on a line 132 and an inverted IRDY#_OE# signal on a line 133.

For functional block 52, an IRDY#_IN signal is received from IRDY# line 128 on a line 141. Since an IRDY#_OUT signal is well-behaved, an IRDY#_OUT signal is placed directly on a line 142. A IRDY#_OE# signal on a line 143 is not used.

For functional block 53, an IRDY#_IN signal is received from IRDY# line 128 on a line 151. Functional block 53 does not require an output component.

In logic block 54, a logic NOR gate 126 performs a logic NOR on the inverted output of logic NAND gate 134 and the inverted signal on line 142 in order to generate the IRDY# signal on IRDY# line 128.

Figure 8:
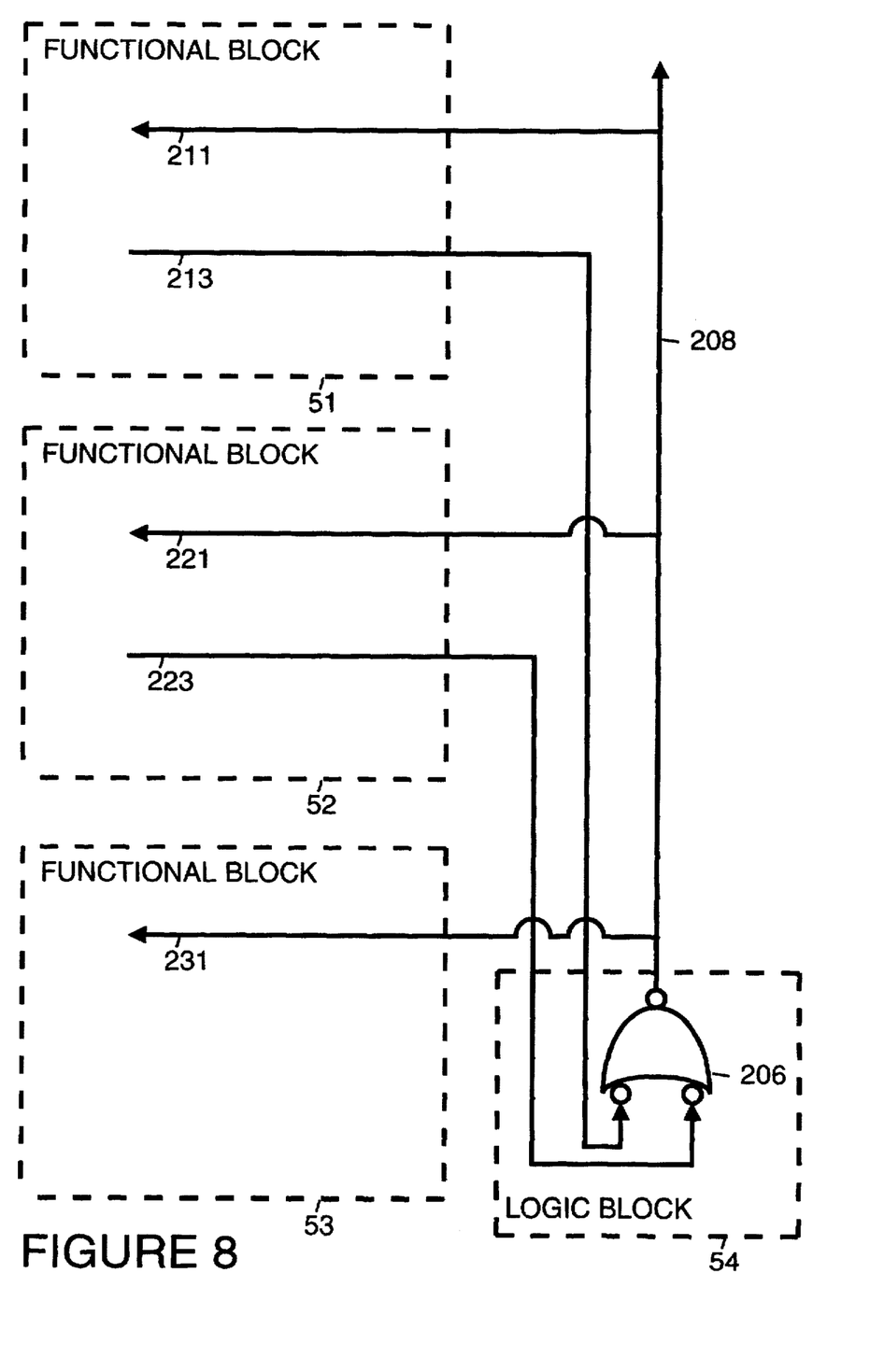
FIG. 8 shows how equivalent bus signals may be implemented when integrating logic blocks with a local bus interface into a single integrated circuit in accordance with a preferred embodiment of the present invention.

FIG. 8 shows implementation of the present invention for an open drain signal such as INTA# signal. A INTA# line 208, within PCI bus 50. INTA# line 208 carries the INTA# signal for PCI bus 50.

For functional block 51, an INTA#_IN signal is received from INTA# line 208 on a line 211. The INTA#_OE# signal on a line 213 is used in place of an output component of INTA#.

For functional block 52, an INTA#_IN signal is received from INTA# line 208 on a line 221. The INTA#_OE# signal on a line 223 is used in place of an output component of INTA#.

For functional block 53, an INTA#_IN signal is received from INTA# line 208 on a line 231. Functional block 53 does not require an output component.

In logic block 54, a logic NOR gate 206 performs a logic NOR on the inverted signal on line 213 and the inverted signal on line 224 in order to generate the INTA# signal on INTA# line 208.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. An integrated circuit comprising:

a bus that operates in accordance with a bus protocol which includes a first control signal that can be implemented using a pull-up resistor and using tri-state gates within functional blocks attached to the bus;

a first functional block, including:
   a first input line for receiving an input component of the first control signal, and
   first logic means for generating a first output component of the first control signal;

a second functional block, including:
   a second input line for receiving the input component of the first control signal, and
   second logic means for generating a second output component of the first control signal; and, a logic block, including:
   first logic for generating the input component of the first control signal, the first logic utilizing the first output component and the second output component to generate the input component of the first control signal.

2. An integrated circuit as in claim 1 additionally comprising, a third functional block, including:
   a third input line for receiving the input component of the first control signal, and
   third logic means for generating a third output component of the first control signal;

wherein the first logic also utilizes the third output component to generate the input component of the first control signal.

3. An integrated circuit as in claim 2 wherein the first logic performs an equivalent of a logic AND on the first output component and the second output component to generate the input component of the first control signal.

4. An integrated circuit as in claim 1 wherein:

the bus protocol includes a second control signal that can be implemented using a pull-up resistor and tri-state gates within the functional blocks attached to the bus;

the first functional block additionally includes:
   a first additional input line for receiving an input component of the second control signal, and
   logic for generating a second output component of the second control signal;

the second functional block additionally includes:
   a second additional input line for receiving the input component of the second control signal, and
   logic for generating a second output component of the second control signal; and, the logic block additionally includes:
   second logic for generating the input component of the second control signal, the second logic utilizing the first output component of the second control signal and the second output component of the second control signal to generate the input component of the second control signal.

5. An integrated circuit as in claim 1 wherein the bus protocol is a Peripheral Component Interconnect (PCI) bus protocol.

6. An integrated circuit as in claim 1 wherein the first logic means performs an equivalent of a logic OR on a first control signal output signal of the first functional block and a first control signal output enable signal of the first functional block.

7. An integrated circuit as in claim 1 wherein the first logic means forwards a first control signal output signal of the first functional block as the first output component of the first control signal.

8. An integrated circuit as in claim 1 wherein the first logic means forwards a first control signal output enable signal of the first functional block as the first output component of the first control signal.

9. An integrated circuit as in claim 1 wherein the first logic performs an equivalent of a logic AND on the first output component and the second output component to generate the input component of the first control signal.

10. An integrated circuit as in claim 1 additionally comprising:
   a third functional block, including:
      a third input line for receiving the input component of the first control signal.

11. A method for implementing a bus interface for functional blocks to a bus, the functional blocks and the bus all being within a single integrated circuit, the method comprising the following steps:
   (a) operating the bus in accordance with a bus protocol, the bus protocol including a first control signal that can be implemented using a pull-up resistor and using tri-state gates within the functional blocks;
   (b) receiving, by a first functional block on a first input line, an input component of the first control signal;
   (c) generating, by the first functional block, a first output component of the first control signal;
   (d) receiving, by a second functional block on a second input line, the input component of the first control signal;
   (e) generating, by the second functional block, a second output component of the first control signal; and,
   (f) generating within a logic block, the logic block being separate from the first functional block and the second functional block, the input component of the first control signal, the logic block utilizing the first output component and the second output component to generate the input component of the first control signal.

12. A method as in claim 11 additionally comprising the following steps:
   (g) receiving, by a third functional block on a third input line, the input component of the first control signal; and,
   (h) generating, by the third functional block, a third output component of the first control signal;
   wherein in step (f) the first logic also utilizes the third output component to generate the input component of the first control signal.

13. A method as in claim 12 wherein step (f) includes performing an equivalent of a logic AND on the first output component and the second output component to generate the input component of the first control signal.

14. A method as in claim 11 additionally comprising the following steps:
   (g) operating the bus in accordance with the bus protocol, so that the bus protocol includes a second control signal that can be implemented using a pull-up resistor and using tri-state gates within the functional blocks;
   (h) receiving, by the first functional block on a third input line, an input component of the second control signal;
   (i) generating, by the first functional block, a first output component of the second control signal;
   (j) receiving, by a second functional block on a fourth input line, the input component of the second control signal;
   (k) generating, by the second functional block, a second output component of the second control signal; and,
   (l) generating, within the logic block, the input component of the second control signal, the logic block utilizing the first output component of the second control signal and the second output component of the second control signal to generate the input component of the second control signal.

15. A method as in claim 11 wherein in step (a) the bus protocol is a Peripheral Component Interconnect (PCI) bus protocol.

16. A method as in claim 11 wherein step (c) includes performing an equivalent of a logic OR on a first control signal output signal of the first functional block and a first control signal output enable signal of the first functional block.

17. A method as in claim 11 wherein step (c) includes forwarding a first control signal output signal of the first functional block as the first output component of the first control signal.

18. A method as in claim 11 wherein step (c) includes forwarding a first control signal output enable signal of the first functional block as the first output component of the first control signal.

19. A method as in claim 11 wherein step (f) includes performing an equivalent of a logic AND on the first output component and the second output component to generate the input component of the first control signal.

20. A method as in claim 11 additionally comprising the following step:
   (g) receiving, by a third functional block on a third input line, the input component of the first control signal.

* * * * *